(12) United States Patent
Tooman et al.

(10) Patent No.: US 7,275,923 B2
(45) Date of Patent: *Oct. 2, 2007

(54) VALVE GATE ASSEMBLY

(75) Inventors: Patrick A. Tooman, Clarkston, MI (US); Bruce Casey, Whitelake, MI (US)

(73) Assignee: Plastic Engineering & Technical Services, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/447,718

(22) Filed: Jun. 6, 2006

(65) Prior Publication Data

US 2006/0222726 A1    Oct. 5, 2006

Related U.S. Application Data

(63) Continuation of application No. 10/985,227, filed on Nov. 10, 2004, now Pat. No. 7,121,820.

(60) Provisional application No. 60/519,312, filed on Nov. 11, 2003.

(51) Int. Cl.
*B29C 45/23* (2006.01)
(52) U.S. Cl. .................. 425/145; 425/564; 425/566
(58) Field of Classification Search ............. 425/562, 425/563, 564, 565, 566
See application file for complete search history.

(56) References Cited

U.S. PATENT DOCUMENTS

| 4,173,448 | A | 11/1979 | Rees et al. |
|---|---|---|---|
| 4,810,184 | A | 3/1989 | Gellert et al. |
| 4,964,795 | A | 10/1990 | Tooman |
| 5,378,138 | A | 1/1995 | Onuma et al. |
| 5,470,219 | A | 11/1995 | Yokoyama et al. |
| 5,491,372 | A | 2/1996 | Erhart |
| 5,531,581 | A * | 7/1996 | Donnell, Jr. ................. 425/145 |
| 5,557,154 | A | 9/1996 | Erhart |
| 5,783,234 | A | 7/1998 | Teng |
| 5,820,803 | A | 10/1998 | Hashimoto |
| 5,834,041 | A | 11/1998 | Sekine et al. |
| 5,840,231 | A | 11/1998 | Teng |
| 5,919,492 | A | 7/1999 | Tarr et al. |
| 6,074,191 | A * | 6/2000 | Gellert et al. ............... 425/130 |
| 6,086,357 | A | 7/2000 | Steil et al. |
| 6,099,767 | A | 8/2000 | Tarr et al. |
| 6,129,541 | A | 10/2000 | Takeda |
| 6,179,604 | B1 | 1/2001 | Takeda |
| 6,294,122 | B1 * | 9/2001 | Moss et al. .................. 425/564 |
| 6,343,925 | B1 | 2/2002 | Jenko |

(Continued)

OTHER PUBLICATIONS

"Exlar-GS Series Linear Actuator Overview", Exlar Corporation, Chanhassen, Minnesota, Mar. 9, 2005, pp. 1 through 2 "Exlar-GS Series Linear Actuator Overview", Exlar Corporation, Chanhassen, Minnesota, Mar. 9, 2005, pp. 1 through 3.

*Primary Examiner*—Tim Heitbrink
(74) *Attorney, Agent, or Firm*—Bliss McGlynn, P.C.

(57) ABSTRACT

A valve gate assembly for regulating a flow of molten material into a mold. The valve gate assembly includes a movable valve that can move between a fully closed position and a fully open position. The valve gate assembly further includes an actuating system operatively cooperating with the valve to move the valve and infinitely position the valve between the fully closed position and the fully open position.

19 Claims, 3 Drawing Sheets

U.S. PATENT DOCUMENTS

| | | |
|---|---|---|
| 6,436,320 B1 | 8/2002 | Kazmer et al. |
| 6,464,909 B1 | 10/2002 | Kazmer et al. |
| 6,514,440 B1 | 2/2003 | Kazmer et al. |
| 6,638,049 B1 | 10/2003 | Moss et al. |
| 2003/0155672 A1 | 8/2003 | Kazmer et al. |

* cited by examiner

VALVE GATE ASSEMBLY

CROSS-REFERENCE TO RELATED APPLICATION

This application is a continuation of U.S. Ser. No. 10/985,227, filed Nov. 10, 2004 now U.S. Pat. No. 7,121,820, which claims the benefit of U.S. Provisional Patent Application Ser. No. 60/519,312, filed Nov. 11, 2003.

BACKGROUND OF THE INVENTION

1. Field of the Invention

The present invention relates generally to valve gates and, more particularly, to a valve gate assembly for regulating a flow of molten material into a cavity of a mold.

2. Description of the Related Art

Injection molding is a widely known manufacturing process used to produce a variety of parts. Injection molding involves introducing a molten material, for example a molten plastic or resin, into a cavity within a mold until the cavity is filled. The molten material hardens or cures in the mold in the shape of inner surfaces of the cavity. After the molten material hardens or cures, the hardened or cured material is removed from the cavity.

For injection molding, a manifold is typically used for conveying molten material from a central injection portion or sprue to a number of cavities or to multiple points within one large cavity of the mold. An example of such a manifold is disclosed in U.S. Pat. No. 4,964,795 to Tooman. In that patent, a manifold has a passageway through which a molten material may pass. The terminal end of the passsageway, called a gate, is in fluid communication with the cavity of the mold.

In addition, a valve gate is typically used with the manifold to regulate the flow of molten material into the cavity of the mold. An example of such a valve gate is disclosed in U.S. Pat. No. 4,173,448 to Rees et al. In that patent, a valve gate is disposed adjacent the gate and includes a valve rod or pin partially disposed within the passageway that has a terminal end positioned such that it closes the gate and prevents the flow of molten material through the gate. However, the pin can move axially away from the gate and, as it moves farther away from the gate, the flow of the molten material through the gate increases.

It is known to provide an actuator to move the pin of the valve gate. Typically, the actuator is of a pneumatic or hydraulic type. The actuator moves the pin of the valve gate from a fully closed position to a fully open position. In the fully open position, the pin is positioned away from the gate, and molten material flows out the passageway through the gate into the cavity of the mold. When the cavity is full, the pin of the valve gate is moved to the fully closed position, thereby plugging the gate and stopping the flow of the molten material out of the passageway into the mold.

One disadvantage of the above-described valve gates is that the pneumatic actuator requires air valves because air is inconsistent in pressure. Another disadvantage of the valve gates is that the hydraulic actuator may leak oil, which is undesired. Yet another disadvantage of the valve gates is that the pin can only be positioned at the fully open position or at the fully closed position, and cannot be positioned between these two positions. A further disadvantage of the valve gates is that they are relatively slow and not very accurate in positioning of the pin.

Therefore, it is desirable to provide a new valve gate that can be infinitely positioned between a fully opened and fully closed position, providing greater control over the flow of molten material into a mold. It is also desirable to provide a valve gate that has an actuator that eliminates the use of pneumatics or hydraulics. It is further desirable to provide a valve gate that has relatively fast actuation and accurate positioning. Therefore, there is a need in the art to provide a valve gate that meets these desires.

SUMMARY OF THE INVENTION

Accordingly, the present invention is a valve gate assembly for regulating a flow of molten material into a mold. The valve gate assembly includes a movable valve that can move between a fully closed position and a fully open position. The valve gate assembly further includes an actuating system operatively cooperating with the valve to move the valve and infinitely position the valve between the fully closed position and the fully open position.

One advantage of the present invention is that a valve gate assembly is provided for regulating a flow of molten material into a mold with more control over the molding process. Another advantage of the present invention is that the valve gate assembly can infinitely adjust the position of the valve during the molding process, thereby adjusting the flow rate of the molten material into the mold. Yet another advantage of the present invention is that the valve gate assembly has fast adjustment of the valve and accurate adjustment of the valve to 0.001 inches. Still another advantage of the present invention is that the valve gate assembly eliminates the use of hydraulics, thereby eliminating oil leaks into the mold. A further advantage of the present invention is that the valve gate assembly eliminates the use of pneumatics, thereby eliminating air valves. Yet a further advantage of the present invention is that the valve gate assembly is consistent and not controlled by pressure.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
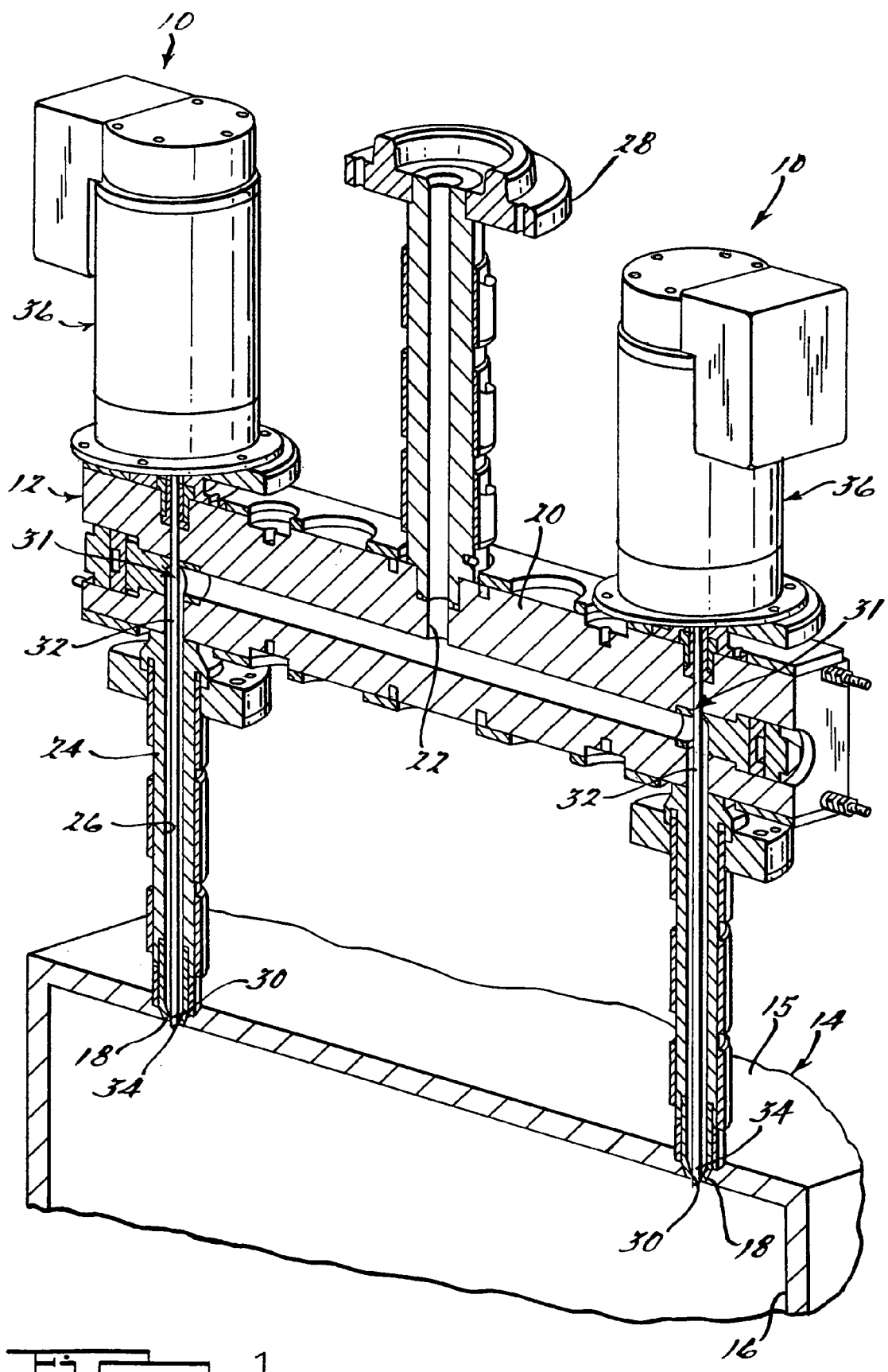
FIG. 1 is a fragmentary perspective view of a valve gate assembly, according to the present invention, illustrated in operational relationship with a manifold assembly and a mold.

Referring to the drawings, and in particular FIG. 1, one embodiment of a valve gate assembly 10, according to the present invention, is shown for a manifold assembly, generally indicated at 12, and a mold, generally indicated at 14. The mold 14 has a first mold half 15 and a second mold half (not shown) defining a cavity 16 therein. The mold 14 also has at least one, preferably a plurality of openings 18 extending through the first mold half 15 and fluidly communicating with the cavity 16. It should be appreciated that, when a molten material (not shown) is introduced into the cavity 16 via the openings 18, the mold 14 contains the molten material, and when the molten material hardens or cures, it holds a shape similar to that of the cavity 16. It should also be appreciated that the mold 14 is conventional and known in the art.

The manifold assembly 12 includes a manifold 20 having a manifold flow passage 22. The manifold assembly 12 also includes as least one, preferably a plurality of nozzles 24 extending downwardly from the manifold 20 and having a nozzle flow passage 26 fluidly communicating with the manifold flow passage 22. The manifold assembly 12 further includes a sprue 28 extending radially outward from the manifold 20 for facilitating the introduction of molten material into the manifold 20. The flow passages 22 and 26 can be of any appropriate shape. The nozzle flow passage 26 narrows and terminates at a gate 30. As illustrated in FIG. 1, the mold 14 is positioned such that the gate 30 is positioned adjacent a respective opening 18 of the mold 14 to allow the nozzle flow passage 26 fluid communication with the cavity 16. The valve gate assembly 10 cooperates with the gate 30 of the manifold assembly 12 to control the flow of molten material from the manifold assembly 12 to the mold 14. It should be appreciated that, although more than one valve gate assembly 10 may be used with the manifold assembly 12, only one valve gate assembly 10 is used with one gate 30 of the manifold assembly 12. It should also be appreciated that the molten material may be of a plastic, metal, wood fibers and plastic, etc. and is injected into the sprue 28 of the manifold assembly 20 from a molding machine (not shown). It should further be appreciated that the manifold assembly 12 is conventional and known in the art.

The valve gate assembly 10, according to the present invention, includes a moveable valve, generally indicated at 31, for regulating the flow of molten material into the cavity 16 of the mold 14. In one embodiment, the valve 31 is a pin or rod-like member 32 cooperating with the gate 30 to regulate the flow of molten material into the cavity 16 of the mold 14. In the embodiment illustrated, the pin 32 is axially aligned with the gate 30 and is at least partially disposed within the nozzle flow passage 26. The cross section of the pin 32 is preferably smaller than the cross section of the flow passage 26 such that the molten material may flow around the pin 32. The pin 32 includes an end 34 that opens and closes the gate 30 in a manner to be described. It should also be appreciated that the pin 32 is conventional and known in the art.

The pin 32 can move axially within the flow passage 26 toward and away from the gate 30 in a manner to be described. The pin 32 can be positioned in a fully open position (i.e., at the top of its stroke), wherein its end 34 is positioned away from the gate 30. The pin 32 can also be positioned in a fully closed position (i.e., at the bottom of its stroke), wherein its end 34 is positioned within the gate 30. Preferably, the size of the end 34 is complementary to that of the gate 30, allowing the end 34 to block and substantially seal the gate 30 when the pin 32 is in its fully closed position. As such, when the pin 32 is in the fully closed position, it seals the gate 30 and molten material will not flow therethrough. When the pin 32 is in the fully open position, molten material will flow through the gate 30 into the mold 14. It should be appreciated that the pin 32 can move between the fully closed and fully open positions and can be stopped at any position therebetween in a manner to be described. It should also be appreciated that the molten material flow through the gate 30 increases as the pin 32 moves from the fully closed position to the fully opened position.

The valve gate assembly 10 also includes an actuating system 36, according to the present invention, operatively cooperating with the pin 32 for moving the pin 32 between the fully closed and fully open positions. In the embodiment illustrated in FIG. 2, the actuating system 36 includes an actuator 38 operatively attached to the pin 32. The actuator 38 axially or linearly moves the pin 32 away and toward the gate 30. The actuator 38 can infinitely position the pin 32 between the fully closed and fully open positions, meaning that the pin 32 can come to rest at the fully closed position, the fully open position, and anywhere in between. In one embodiment, the entire range of movement (i.e., stroke) of the pin 32 between the fully closed and fully open positions is approximately one inch. This infinite movement can occur incrementally. For example, in one embodiment, the actuator 38 incrementally moves the pin 32 a predetermined amount such as approximately 0.001 inch increments. By axially moving the pin 32, the actuating system 36 can seal and unseal the gate 30 as discussed in greater detail below. It should be appreciated that the actuator 38 may be a linear motor, brushless direct current (DC) motor, linear synchronous motor, linear drive, linear servo, or linear tubular motor. It should also be appreciated that the actuator 38 may be of an electro-magnetic, earth magnetic, or electric type. It should further be appreciated that, as the increment becomes smaller, the positioning or movement of the pin 32 becomes infinite.

Figure 2:
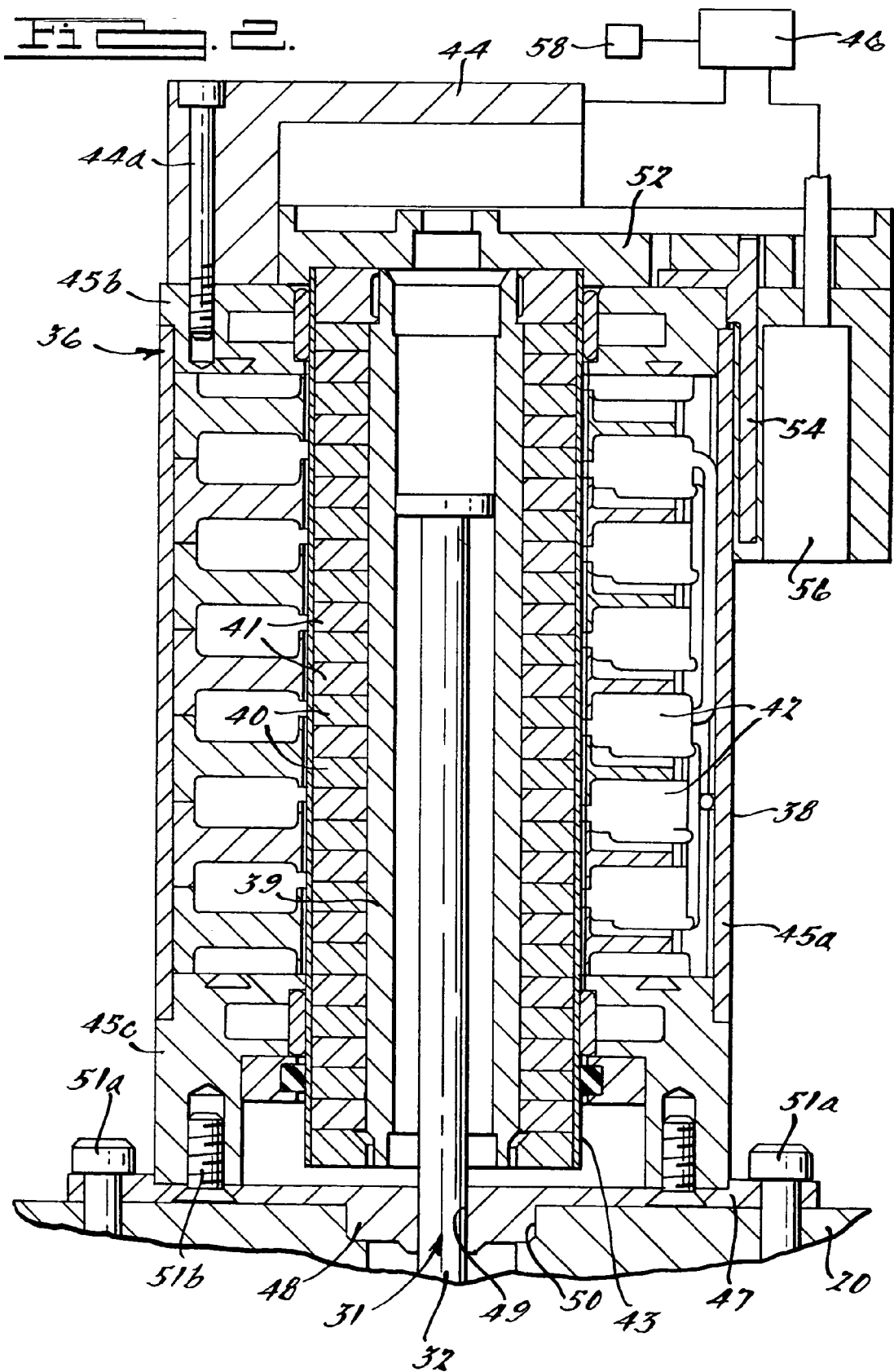
FIG. 2 is an elevational view of one embodiment of an actuating system, according to the present invention, of the valve gate assembly of FIG. 1.

In the embodiment shown in FIG. 2, the actuator 38 is of a linear induction motor type. The actuator 38 includes a core 39 disposed about and connected to the pin 32 at an upper end thereof. The actuator 38 also includes at least one, preferably a plurality of permanent magnets 40 disposed axially and circumferentially about the core 39. The permanent magnets 40 are axially spaced by non-magnetic insulating members 41 disposed axially and circumferentially about the core 39. The actuator 38 includes a cylindrical housing 43 disposed about the permanent magnets 40 and the insulating members 41. It should be appreciated that the pin 32, core 39, permanent magnets 40, insulating members 41, and housing 43 move as a single unit.

The actuator 38 includes at least one, preferably a plurality of electromagnets 42 spaced axially and disposed circumferentially about the permanent magnets 40. The actuator 38 also includes an electrical connector 44 electrically connected to the electromagnets 42 and a source of power such as a controller 46 to be described. The actuator 38 includes a cylindrical housing 45a disposed about the electromagnets 42 and an upper end plate 45b closing one end of the housing 45a and a lower end plate 45c closing the other end of the housing 45a. The electrical connector 44 is connected to the upper end plate 45b by suitable means such as a fastener 44a. It should also be appreciated that, when the electromagnets 42 are in the correct position relative to the permanent magnets 40, the electromagnets 42 are energized by the controller 46 and repel the permanent magnets 40 to move the core 39 and pin 32 linearly.

The actuator 38 includes a plate 47 at a lower end for attachment to the manifold 20. The plate 47 has a locator 48 extending axially therefrom for locating the plate 47 relative to the manifold 20. The locator 48 has an aperture 49 extending axially therethrough through which the pin 32 extends. The locator 48 is located in a recess 50 of the manifold 20 and the plate 47 is attached to the manifold 20 by suitable means such as fasteners 51a. The plate 47 is attached to the lower end plate 45c by suitable means such as fasteners 51b. The actuator 38 includes a moveable plate 52 at an upper end thereof. The plate 52 is attached to the upper end of the pin 32. It should be appreciated that the electromagnets 42 and plate 47 are fixed relative to the manifold 20.

The actuating system 36 also includes an encoder 54. The encoder 54 may be of any appropriate type, including linear and rotary encoders. The encoder 54 may employ any appropriate position sensing mechanism. In one embodiment, the encoder 54 includes a sensing device 56 such as a photodetector. The encoder 54 is attached to the movable plate 52 such that the encoder 54 travels with the pin 32. Also, the sensing mechanism 56 is fixedly attached to the actuator 38 and disposed parallel to the travel of the pin 32. As such, when the pin 32 moves, the encoder 54 moves relative to the sensing mechanism 56 and detects the change in position as the encoder 54 travels linearly. The sensing device 56 translates the change in position (i.e., the position of the pin 32) to an electronic encoder signal. It should be appreciated that the sensing device 56 is electrically connected to the controller 46 to be described.

The actuating system 40 further includes a controller 46 electrically connected to the sensing device 56 and the actuator 38. The controller 46 receives the encoder signals and translates these encoder signals into a control signal. The controller 46 sends these control signals to the actuator 38 to energize and deenergize the electromagnets 42 of the actuator 38, thereby causing the actuator 38 to move the pin 32 toward or away from the gate 30. It should be appreciated that the controller 46 may be any suitable type of computer, for example, a personal computer (PC) or a programmable logic controller (PLC).

The valve gate assembly 10 includes an input device 58, such as a keyboard, electrically connected to the controller 46. With the input device 58, a user can manually input information to the controller 46, such as the desired position of the pin 32.

In operation, the molding process can begin with the pin 32 in the fully closed position such that the molten material in the manifold assembly 12 is prevented from flowing into the cavity 16 of the mold 14. When it is determined to allow molten material into the cavity 16 of the mold 14, the controller 46 sends control signals to the actuator 38 to energize and de-energize the electromagnets 42 to repel the permanent magnets 40 and move them linearly, which actuates the pin 32 and moves the end 34 of the pin 32 linearly away from the gate 30. The sensing mechanism 56 detects the change in position of the pin 32 via the encoder 54, and feeds back encoder signals to the controller 46. When the pin 32 reaches the desired position, the controller 46 receives the corresponding encoder signals and the controller 46 stops sending control signals to the actuator 38, thereby stopping the actuator 38 from actuating. When the pin 32 is in the desired open position, the molten material flows through the passageway 26 and gate 30 and into the cavity 16 of the mold 14. It should be appreciated that the actuator 38 can infinitely position the pin 32 anywhere between the fully closed and fully open positions and allows for quick and accurate adjustment of the flow of molten material into the cavity 16 of the mold 14.

Figure 3:
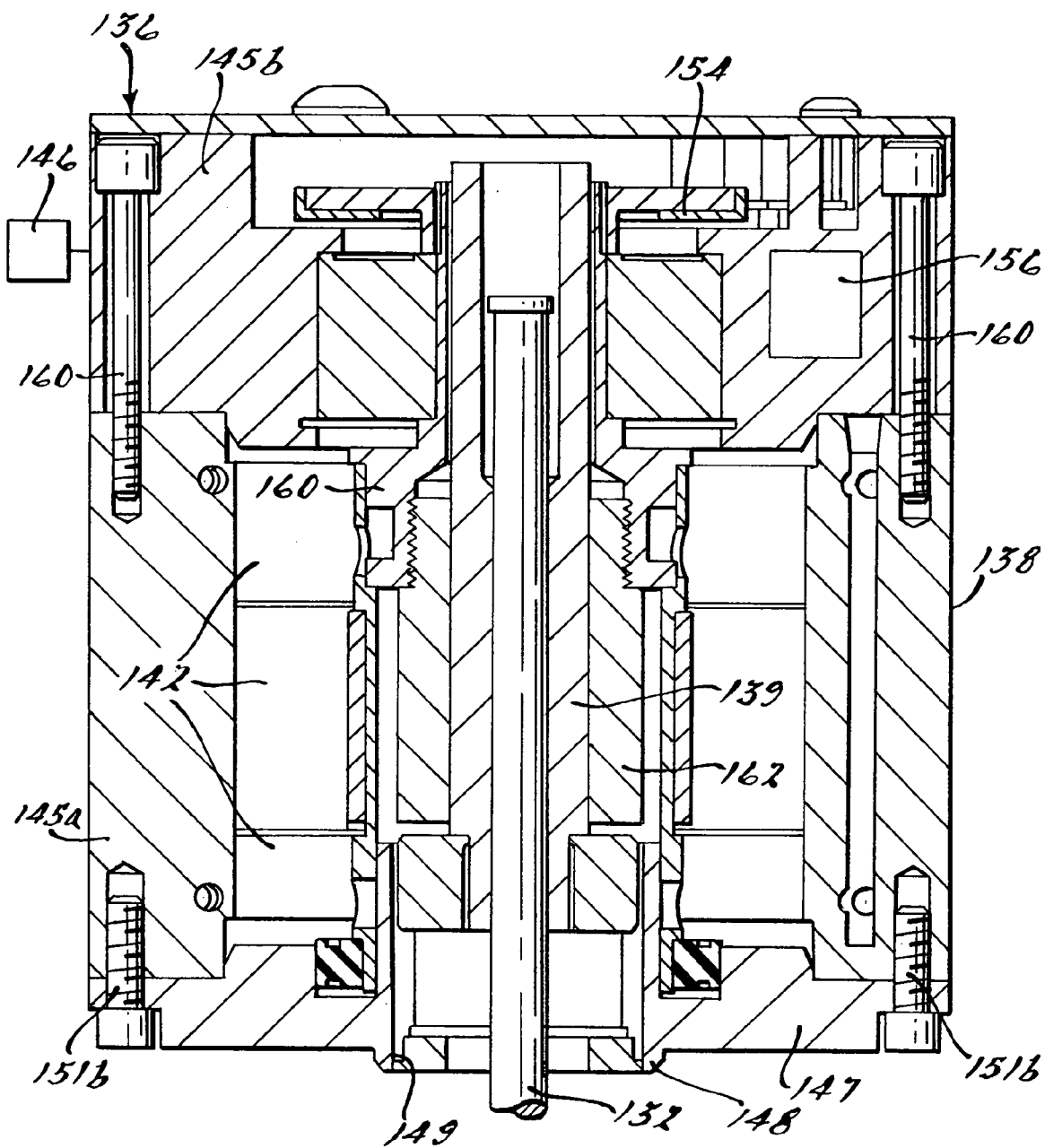
FIG. 3 is an elevational view of another embodiment of an actuating system, according to the present invention, of the valve gate assembly of FIG. 1.

Referring to FIG. 3, another embodiment, according to the present invention, of the actuating system 36 is shown. Like parts of the actuating system 36 have like reference numerals increased by one hundred (100). In this embodiment, the actuating system 136 includes the actuator 138 operatively attached to the pin 132. The actuator 138 is of a linear motor type. The actuator 138 includes a core 139 disposed about and connected to the pin 132 at an upper end thereof. The actuator 138 includes a rotatable nut 160 and a hollow ball screw 162 connected to the core 139 and threadably engaged with the nut 160 for cooperating with the nut 160. The actuator 138 also includes at least one, preferably a plurality of electromagnets 142 spaced axially and disposed circumferentially about the core 139. The actuator 138 also includes an electrical connector (not shown) electrically connected to the electromagnets 142 and a source of power such as a controller 146. The actuator 138 includes a cylindrical housing 145a disposed about the electromagnets 142 and an upper end plate 145b closing the upper end of the housing 145a. The upper end plate 145b is connected to the housing 145a by suitable means such as fasteners 160.

The actuator 138 includes a plate 147 at a lower end for attachment to the manifold 20. The plate 147 has a locator 148 extending axially therefrom for locating the plate 147 relative to the manifold 20. The locator 148 has an aperture 149 extending axially therethrough through which the pin 132 extends. The plate 147 is attached to the housing 145a by suitable means such as fasteners 151b.

The actuating system 136 also includes an encoder 154. The encoder 154 is a rotary encoder. The encoder 154 includes a sensing device 156 such as a photodetector. The encoder 154 is attached to the rotatable nut 160. Also, the sensing mechanism 156 is fixedly attached to the actuator 138. As such, when the nut 160 rotates and the pin 132 moves, the encoder 154 moves relative to the sensing mechanism 156 and detects the change in position as the encoder 154 rotates. The sensing device 156 translates the change in position (i.e., the position of the pin 132) to an electronic encoder signal. It should be appreciated that the sensing device 156 is electrically connected to the controller 146.

In operation, the molding process can begin with the pin 132 in a fully closed position such that molten material in the manifold assembly 12 is prevented from flowing into the cavity 16 of the mold 14. When it is determined to allow molten material into the cavity 16 of the mold 14, the controller 146 sends control signals to the actuator 138 to energize and de-energize the electromagnets 142 to rotate the nut 160. Rotation of the nut 160 moves the ball screw 162 linearly, which actuates the pin 132 and moves the end 134 of the pin 132 linearly away from the gate 30. The sensing mechanism 156 detects the change in position of the pin 132 via the encoder 154, and feeds back encoder signals to the controller 146. When the pin 132 reaches the desired position, the controller 146 receives the corresponding encoder signals and the controller 146 stops sending control signals to the actuator 138, thereby stopping the actuator 138 from actuating. When the pin 132 is in the desired open position, the molten material flows through the passageway 26 and gate 30 and into the cavity 16 of the mold 14.

Accordingly, the valve gate assembly 10 provides the user with more control during the molding process by allowing the pin 32, 132 position to be infinitely adjusted. For example, a molding process may be working effectively; however, environmental changes or wear in the mold might render that process less effective. The valve gate assembly 10 of the present invention allows the user to make changes to the process (i.e., changes in pin position or actuation timing), thereby maintaining the production of quality parts.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A valve gate assembly for regulating a flow of molten material into a mold comprising:
a movable valve that can move between a fully closed position and a fully open position; and
an actuating system including an electrically operated actuator operatively attached to said valve, said actuator including a core connected to said valve and at least one electromagnet for moving said pin, said actuating system operatively cooperating with said valve to incrementally move said valve a predetermined amount to position said valve between the fully closed position and the fully open position.

2. A valve gate assembly as set forth in claim 1 wherein said actuating system includes a detector for detecting a position of said valve and translating the position of said valve into a position signal.

3. A valve gate assembly as set forth in claim 2 wherein said actuating system includes a controller electrically connected to said actuator and said detector for receiving the position signal, translating the position signal into a control signal, and sending the control signal to said actuator, the control signal causing said actuator to move said valve and position said valve between the fully closed position and the fully open position.

4. A valve gate assembly for regulating a flow of molten material into a mold comprising:
a movable valve that can move between a fully closed position and a fully open position;
an actuating system including an electrically operated actuator operatively attached to said valve, said actuating system operatively cooperating with said valve to incrementally move said valve a predetermined amount to position said valve between the fully closed position and the fully open position; and
wherein said predetermined amount is approximately 0.001 inch.

5. A valve gate assembly as set forth in claim 1 wherein said valve comprises a pin extending axially and having one end attached to said actuator and another end capable of moving toward and away from a gate of the mold.

6. A valve gate assembly as set forth in claim 1 wherein said actuator includes at least one permanent magnet disposed about said core and said at least one electromagnet is disposed about said permanent magnet.

7. A valve gate assembly as set forth in claim 1 wherein said actuator includes a hollow ball screw disposed about said core, a rotatable nut threadably engaged with said screw, and said at least one electromagnet being disposed about said nut.

8. A valve gate assembly as set forth in claim 1 including a housing disposed about said at least one electromagnet.

9. A valve gate assembly as set forth in claim 1 wherein said actuator is one of a group comprising a linear motor, a brushless direct current motor, a linear synchronous motor, a linear drive motor, a linear induction motor, a linear servo motor, a linear tubular motor, an electro-magnetic actuator, an earth magnetic actuator, and an electric actuator.

10. A valve gate assembly as set forth in claim 9 wherein said detector comprises a photodetector.

11. A valve gate assembly for regulating a flow of molten material into a mold comprising:
a movable pin that can move between a fully closed position and a fully open position;
an electrically operated actuator including a core attached to said pin and at least one electromagnet for moving said pin and infinitely positioning said pin between the fully closed position and the fully open position;
a detector for detecting a position of said pin and translating the position of said pin into a position signal; and
a controller electrically connected to said actuator and said detector for receiving the position signal, translating the position signal into a control signal, and sending the control signal to said actuator, the control signal causing said actuator to incrementally move said pin a predetermined amount and position said pin between the fully closed position and the fully open position.

12. A valve gate assembly as set forth in claim 11 wherein said predetermined amount is approximately 0.001 inch.

13. A valve gate assembly for regulating a flow of molten material into a mold comprising:
a movable pin that can move between a fully closed position and a fully open position;
an electrically operated actuator operatively attached to said pin for moving said pin and infinitely positioning said pin between the fully closed position and the fully open position;
a control system electrically connected to said actuator to incrementally move said pin a predetermined amount and position said pin between the fully closed position and the fully open position; and
wherein said actuator includes a core connected to said pin, at least one permanent magnet disposed about said core, and at least one electromagnet disposed about said permanent magnet for moving said pin.

14. A valve gate assembly for regulating a flow of molten material into a mold comprising:
a movable pin that can move between a fully closed position and a fully open position;
an electrically operated actuator operatively attached to said pin for moving said pin and infinitely positioning said pin between the fully closed position and the fully open position;
a control system electrically connected to said actuator to incrementally move said pin a predetermined amount and position said pin between the fully closed position and the fully open position; and
wherein said actuator includes a core attached to said pin, a ball screw disposed about said core, a rotatable nut threadably engaged with said screw, and at least one electromagnet disposed about said nut and being operable to rotate said nut for moving said pin.

15. A valve gate assembly as set forth in claim 11 wherein said actuator includes a housing disposed about a portion of said pin.

16. A valve gate assembly as set forth in claim 11 wherein said detector comprises a photodetector.

17. A valve gate assembly as set forth in claim 11 wherein said actuator is one of a group comprising a linear motor, a brushless direct current motor, a linear synchronous motor, a linear drive motor, a linear induction motor, a linear servo motor, a linear tubular motor, an electro-magnetic actuator, an earth magnetic actuator, and an electric type actuator.

18. A valve gate assembly for regulating a flow of molten material into a mold comprising:
a movable pin that can move between a fully closed position and a fully open position;

an actuator operatively attached to said pin for moving said pin and infinitely positioning said pin between the fully closed position and the fully open position;

said actuator comprising a core connected to said pin, at least one permanent magnet disposed about said core, and at least one electromagnet disposed about said permanent magnet for moving said pin;

a detector for detecting a position of said pin and translating the position of said pin into a position signal; and a controller electrically connected to said actuator and said detector for receiving the position signal, translating the position signal into a control signal, and sending the control signal to said actuator, the control signal causing said actuator to incrementally move said pin a predetermined amount and incrementally position said pin between the fully closed position and the fully open position.

19. A valve gate assembly for regulating a flow of molten material into a mold comprising:

a movable pin that can move between a fully closed position and a fully open position;

an actuator operatively attached to said pin for moving said pin and infinitely positioning said pin between the fully closed position and the fully open position;

said actuator comprising a core attached to said pin, a ball screw disposed about said core, a rotatable nut threadably engaged with said screw, and at least one electromagnet disposed about said nut and being operable to rotate said nut for moving said pin;

a detector for detecting a position of said pin and translating the position of said pin into a position signal; and a controller electrically connected to said actuator and said detector for receiving the position signal, translating the position signal into a control signal, and sending the control signal to said actuator, the control signal causing said actuator to incrementally move said pin a predetermined amount and incrementally position said pin between the fully closed position and the fully open position.

* * * * *